United States Patent Office 3,494,217
Patented Feb. 10, 1970

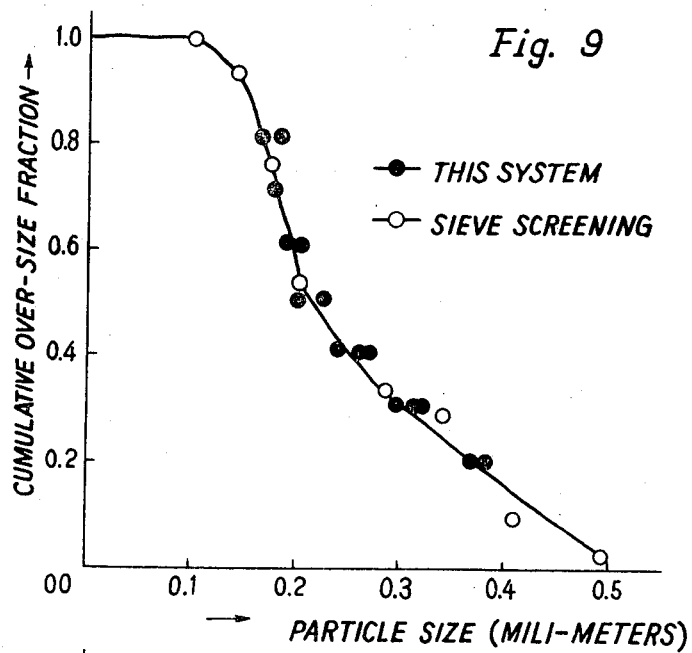
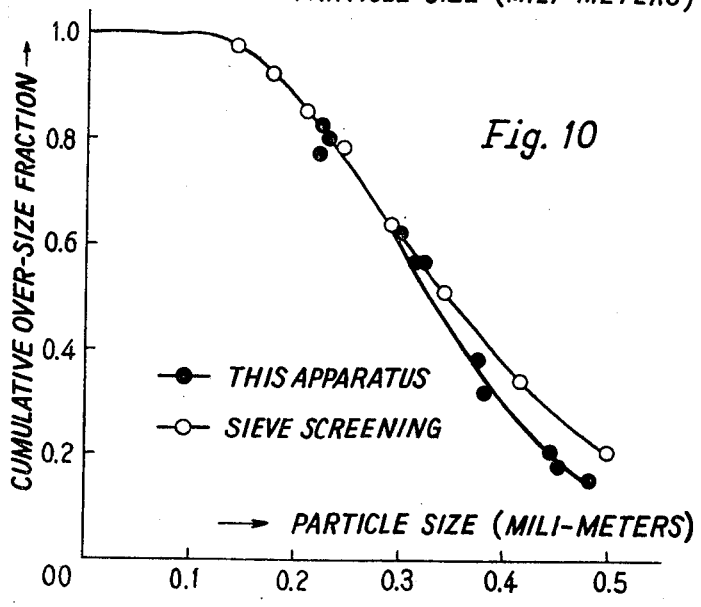

3,494,217
PARTICLE-SIZE MEASURING SYSTEM
Tatsuo Tanaka, 373 Nakanoshima, Sapporo-shi; Keishi Gotoh, 2–1, Ashibe-machi, Kita-ku, Nagoya-shi, and Hiroshi Kajiura, 1–24, Mivazonodohri, Nakano-ku, Tokyo-to, all of Japan
Filed Oct. 30, 1967, Ser. No. 678,864
Claims priority, application Japan, Mar. 15, 1967,
42/15,820
Int. Cl. G01f 5/00
U.S. Cl. 73—432          9 Claims

ABSTRACT OF THE DISCLOSURE

A particle-size measuring system which provides a grading analysis of powdery material by utilizing a classifier for separating continuously a flow of the powdery material into two streams with respect to a cut-off size which is variable in accordance with a manipulated variable of the classifier; where the numerical relationship which eventually indicates the flow rate ratio between the two streams is detected and employed to control the manipulated variable, and a cumulative over-or-under size distribution can be obtained by continuously changing the manipulated variables.

---

This invention relates to a particle-size measuring system which provides a grading analysis of a powdery material.

In the technology of handling powder, flour or other powdery materials, it is very important in view of the quality control of the products and the desire to improve the yield rate of the products, etc., to measure and regulate the particle size (e.g., the average size) or size-distribution of the powdery materials. For this purpose, there have been heretofore proposed many devices such as a sieve, the Andreasen pipette, a sedimentation balance, and a device using a light adsorption method (micro photosizer). In all of these conventional devices, however, a relatively long period of time is necessary to obtain a measurement result from a sample of the questioned powdery material. Moreover, conventional devices cannot be applied to measure continuously the particle size or size-distribution of the sample taken from the powdery material which flows along an assembly or process line. Namely, if the result obtained from the sample was undesirable and the operator wished to adjust the particle size or size-distribution in the lot of said sampled powdery material, the operator could not do it since the lot of said sampled powdery material would have already been moved along to the succeeding process. The continuous and automatic measurement of the particle size is essential to realize an assembly-line production using powdery materials in which the cost of the products is reduced and the quality of the products is improved. However, such requirements cannot be met by conventional measuring devices unless the above-mentioned defects of the conventional devices are removed.

An object of this invention is to provide a particle size measuring system capable of providing in a relatively short time an on-line grading analysis of a powdery material that is produced continuously in a suitable processing operation.

Said object and other objects of this invention have been attained by the system of this invention for measuring the size-distribution of a powdery material by use of a classifier, characterized in that the classifier separates continuously a flow of the powdery material into two streams with respect to a cut-off size which is variable in accordance with a manipulated variable of this classifier, and that a numerical relationship eventually indicating a ratio between the flow rate of the powdery material and the flow rate of one of the two streams are regulated so as to be equal to a known value, whereby the size distribution in the powdery material can be measured in a short time to vary the cut-off size of the classifier in accordance with the change of the manipulated variable.

The novel features of this invention are set forth with particularity in the appended claims, however, this invention, as to its construction and operation together with other objects and advantages thereof, may best be understood by reference to the following descriptiton, taken in connection with the accompanying drawings, in which the same parts are designated by the same characters, numerals and symbols as to one another, and in which:

FIGURE 9 is a characteristic curve for describing experimental results obtained in the system of FIGURE 2 for glass spheres in which the abscissa is the particle size in millimeters and the ordinate is the cumulative oversize fraction;

FIGURE 10 is a characteristic curve for describing experimental results obtained in the system of FIGURE 2 for silica sands and illustrated in the same manner as in FIGURE 9.

Figure 1:
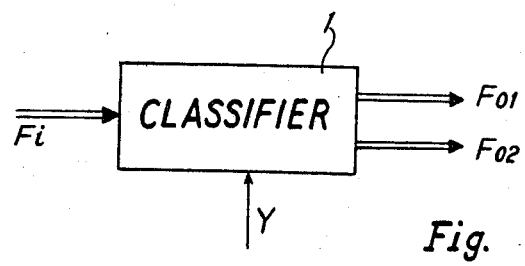
FIGURE 1 is a block-diagram for describing the principle of this invention.

Referring to FIGURE 1, the principle of the system according to this invention will first be described. A flow $F_i$ of powdery material supplied from a process-line is fed into a classifier 1. This classifier 1 satisfies the following requirements:

(i) The cut-off size $x_c$ of the classifier 1 for the powdery material can be calculated by the manipulated variable $y$ of the classifier 1.

(ii) The manipulated variable $y$ of the classifier 1 can be changed easily and continuously.

(iii) The powdery material can be continuously fed into and discharged from the classifier 1.

(iv) At least one of the flow rates taken from the classifier 1 can be measured immediately.

(v) The separation of the powdery material with respect to the cut-off size $x_c$ can be carried out in a relatively short time. In the above-mentioned classifier 1, the input flow $F_i$ is continuously separated into two streams (i.e.; a stream $F_{01}$ of coarse particles and a stream $F_{02}$ of fine particles) with respect to the cut-off size $x_c$. If a clean-separation of particles is attained in the classifier 1 with respect to the cut-off size $x_c$, the ratio $R(x_c)$ or $P(x_c)$ of the flow rate $f_{01}$ (or $f_{02}$) of the stream $F_{01}$ (or $F_{02}$) to the flux $f_i$ of the input flow $F_i$ can be indicated as follows:

$$R(x_c) = f_{01}/f_i \qquad (1a)$$

(where $R(x_c)$ means that R is a function of $x_c$); or $$P(x_c) = f_{02}/f_i \qquad (1b)$$

There ratios $R(x_c)$ and $P(x_c)$ will be respectively referred as "oversize fraction" and "undersize fraction" below.

The cut-off size $x_c$ can be generally indicated by a function of the manipulated variable $y$ of the classifier 1 as follows:

$$x_c = h(y) \qquad (2)$$

where $h$ denotes a function, the form of which will be described later with reference to Equations 5, 6 and 7.

Since it is possible to measure fluxes $f_i$, $f_{01}$ (or $f_{02}$) and the variable $y$, the ratio $R(x_c)$ or $P(x_c)$ and the cut-off size $x_c$ are easily determined from the Equations $1a$ (or $1b$) and 2. Namely, if the ratio $R(x_c)$ or $P(x_c)$ is automatically controlled so as to keep a predetermined value $R_s$, the manipulated variable $y$ of the classifier 1 gives the cut-off size $x_c$ in accordance with the Equation 2. As an example, if the value $R_s$ is set at a value 0.5 $(=50\%)$ by controlling the manipulated variable $y$, the cut-off size $x_c$ of this case obtained in accordance with the Equation 2 will show the average size of the powdery material.

Accordingly, if the manipulated variable $y$ is continuously changed, the smooth curve of the size-distribution of the powdery material can be obtained by the system of the present invention.

Figure 2:
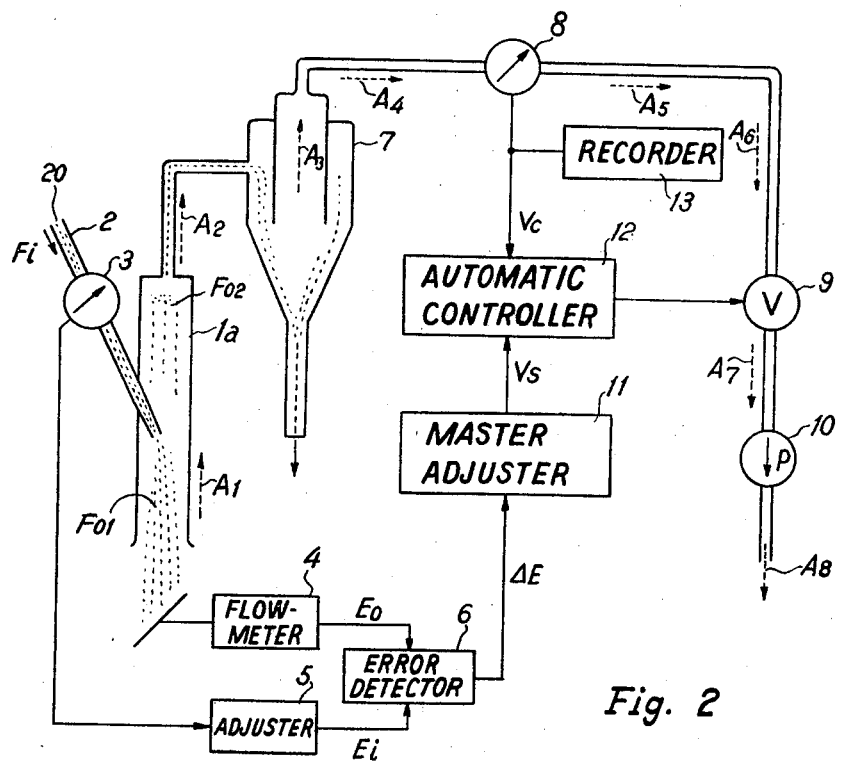
FIGURE 2 is a more detailed block diagram for describing the principle of this invention.

An embodiment of this invention applicable to measure continuously the size-distribution of the powdery material in a process-line will be described with reference to FIGURE 2. In this embodiment, an air elutriator $1a$ of a suction type is employed as the classifier 1. The suction of air is carried out by a pump 10, and the induced air is passed through the tube of the air elutriator $1a$, via a cyclone 7 and a throttle valve 9. A flow-meter 8 is of a differential pressure type and is employed for measuring the linear velocity $u$ of the air as a controlled variable $V_c$. The powdery material 20 is fed, through a guide 2, to the middle point of the tube of the air elutriator $1a$ and separated continuously into two streams $F_{01}$ and $F_{02}$ by the upward stream of air the direction of which is shown by arrows $A_1, A_2, \ldots$. The flow rate of the input powdery material 20 is measured by a flow-meter 3 arranged at the guide 2. The flow-meter 3 is of the impact line type and composed of a beam balance and a differential transformer.

The stream $F_{02}$ of fine particles separated from the input powdery material $F_i$ is carried over from the top of the air elutriator $1a$, and the fine particles are collected at the cyclone 7 and taken out in an air tight condition from the cyclone 7, while the stream $F_{01}$ of coarse particles separated from the input powdery material $F_i$ flow out, as tailing, from the lower end of the air elutriator $1a$ and the flow rate of the coarse particles are measured simultaneously by a flow meter 4. This flow meter 4 is also of the impact-line type having the same sensitivity as that of the flow meter 3. It is not essential that the flow-out of the fine particles is carried out in a perfect air-tight condition, since the flow speed of the air in the cyclone 7 is not very high. Accordingly, this requirement can be easily satisfied by flowing-out the fine particles through an accumulator by way of example.

The value of the output signal of the flow-meter 3 is reduced to $R_s(<1)$ times by use of an adjuster 5 (e.g.; a variable transformer), so that the output signal $E_i$ of the adjuster 5 becomes equal to a value $K \cdot f_i \cdot R_s$. In this case, K is the sensitivity constant of the flow-meter 3. On the other hand, the output signal $E_o$ from the flow-meter 4 is of a value $K \cdot f_{01}$. These signals $E_0$ and $E_i$ are applied to an error detector 6. Accordingly, the output error signal $\Delta E$ of the error detector 6 is as follows:

$$\Delta E = E_i - E_o = K \cdot f_i \cdot R_s - K \cdot f_{01} \qquad (3)$$

From the Equation $1a$, this equation becomes $$\Delta E = K \cdot f_i \{R_s - R(x_c)\} \qquad (4)$$

Therefore, when the error signal $\Delta E$ is zero, the oversize fraction $R(x_c)$ which corresponds to the cut-off size $x_c$ is equal to the predetermined value $R_s$.

The error signal $\Delta E$ is applied to a master controller 11, which is of an integrator and controls the setting point $V_s$ of an automatic controller 12 in accordance with the sign and amount of the error signal $\Delta E$. In this sense, it may be noted that the master controller 11 has not only "integral action (I-action)," but also "proportional action (P-action)" and "differential action (D-action)." Accordingly, a conventional controller having P.I.D.-actions may be used in place of the master controller 11.

The automatic controller 12 is a so-called "cascade control system" and controls the throttle valve 9 so as to make the controlled variable $V_c$ and the setting point $V_s$ coincide with each other, so that the air velocity $u$ in the elutriator $1a$ is changed in an appropriate direction until the error signal $\Delta E$ becomes zero.

As mentioned above, the cut-off size $x_c$ of the elutriator $1a$ is substantially determined by the manipulated variable $y$ which is the air velocity $u$ in the elutriator $1a$. In this case, the relationship between the cut-off size $x_c$ and the air velocity $u$ is given by the following equations, as disclosed in "Perry, Chemical Engineer's Handbook, 4th edition, section 5—page 59" published in 1963:

(i) In a range: $Re<10$ (Stokes region)

$$u = (\rho_p - \rho)g \cdot x_c^2 / 18\mu \qquad (5)$$

(ii) In a range: $10<Re<500$ (Allen's region)

$$u = \{4(\rho_p - \rho)^2 g^2 / 225\mu\rho\}^{1/3} \cdot x_c \qquad (6)$$

(iii) In a range: $Re>$ (Newton's region)

$$u = \{3(\rho_p - \rho)g/\rho\}^{1/2} \cdot x_c^{1/2} \qquad (7)$$

where:
$Re$—Reynolds number $(u \cdot \rho \cdot x_c / \mu)$
$\rho_p$—density of the powdery material
$\rho$—density if air
$g$—acceleration of gravity
$\mu$—viscosity of air Accordingly, when the error signal $\Delta E$ is equal to zero, the particle size corresponding to the oversize fraction $R(x_c)$ equal to the predetermined value $R_s$ can be obtained from the Equations 5, 6 or 7. In this case, the air velocity $u$ is measured by the flow-meter 8 which is an orifice flow-meter by way of example and indicated by a recorder 13 or another indicator. Accordingly, the cumulative over-size-distribution curve can be obtained by varying the value $R_s$ to desired various values by use of the adjuster 5. It was confirmed by use of a Pitot tube that the air velocity profile in the elutriator $1a$ was reasonably flat.

Figure 3:
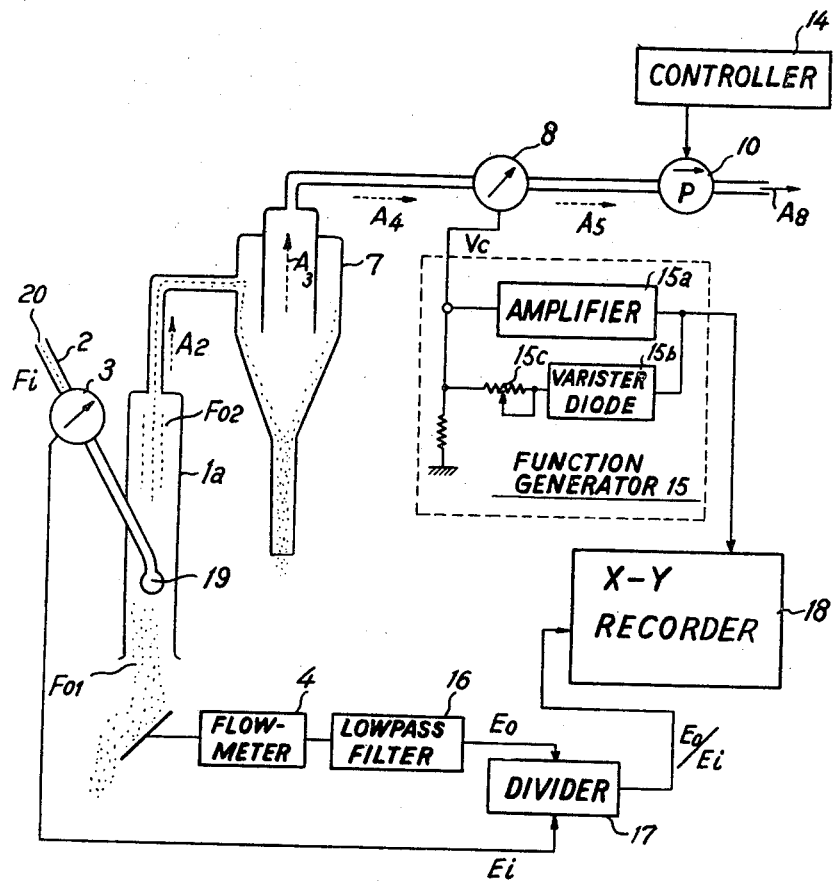
FIGURE 3 is a block-diagram illustrating another embodiment of this invention to measure the size-distribution of a powdery material.

With reference to FIGURE 3, another embodiment of this invention for measuring a cumulative size-distribution of a powdery material will be described. Only the constructions and operation differing from that of the embodiment shown in FIGURE 2 will be described to simplify the explanation thereof. In this embodiment, the powdery material 20 is fed into the tube of the elutriator $1a$ by use of a particle distributor 19, without the vertical component of the velocity, so that the relative velocity of the particles with respect to the surrounding air becomes immediately equal to the terminal velocity. The air velocity $u$ is continuously and uniformly changed over a desired range by use of a manual or automatic power controller 14 for the suction pump 10. The output signal of the flow meter 4 is applied through a low-pass filter 16 for eliminating fluctuated components, to a divider 17. This divider 17 is composed of a DC amplifier and a servo-mechanism by way of example and has a time delay for the division operation, especially for the change of the flow rate $f_i$. The output signal $E_o/E_i$ is applied to an X–Y recorder 18 as its Y-signal.

On the other hand, the output signal $V_c$ of the flow-meter 8 is applied to a function generator 15, which is employed to calculate the output signal $V_c$ of the flowmeter 8 in accordance with the Equation 2. An example of the function generator 15 is composed of an amplifier 15a having a varister diode 15b and a variable resistor 15c in its feed back circuit. The Equation 2 is calculated numerically using Schepherd-Lappele's drag coefficient (see Shepherd and Lapple, "Industrial and Engineering Chemistry, analytical edition, vol. 32 page 605" published in 1940), covering approximately all the Stokes, Allen and Newton regions described above, and the relationship between the input and output signals of the function generator 15 is graphically approximated to the desired result, of course, it may be possible to use any one of the Equations 5, 6 and 7 in place of the Equation 2. The calculated value is applied to the X–Y recorder 18 as its X-signal. If the continuous change of the cut-off size $x_c$ is carried out by the power adjustment of the suction pump 10, a cumulative size-distribution curve is described on the X–Y recorder per each unidirectional change of the controller 14.

In place of the air elutriator 1a, other types of classifiers can be employed as the classifier 1 so long as they satisfy the above-mentioned requirements. One example of these other types of classifiers is a centrifugal separator 1b, the construction of which is illustrated in FIGURES 4 to 8.

This separator 1b comprises a distributor 100, a circular plate 200, a particle guide 300, a shaft 400, an inlet guide 500, a chamber 600 and other supporting means. The distributor 100 is employed to apply centrifugal force to the powdery material supplied through the inlet guide 500. The distributor 100 and the guide 300 are respectively fixed on and under the circular plate 200 and rotated together with the shaft 400.

Figure 4:
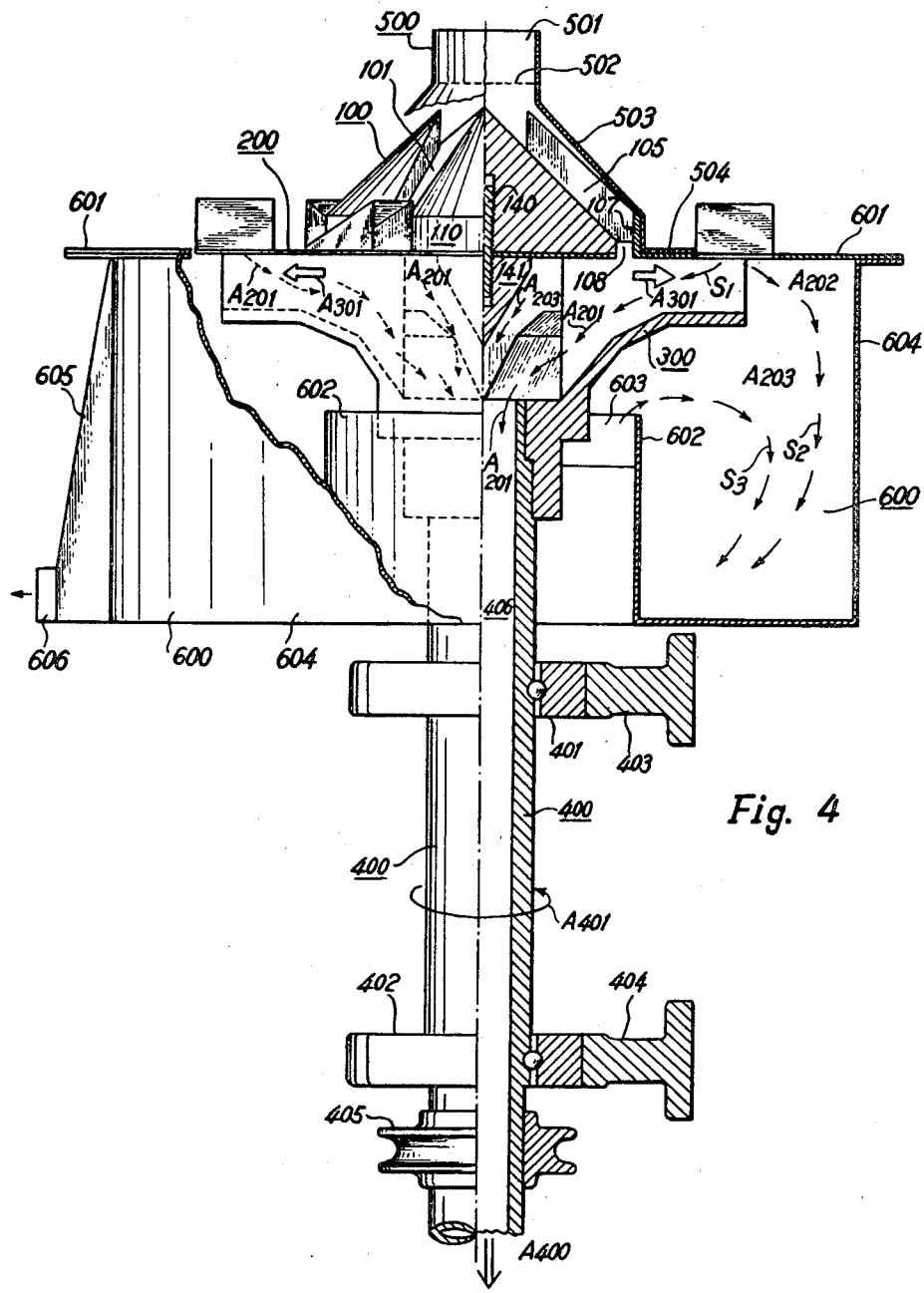
FIGURE 4 is an elevation view partly in section illustrating an example of a classifier to be used in the system of this invention.
Figure 5:
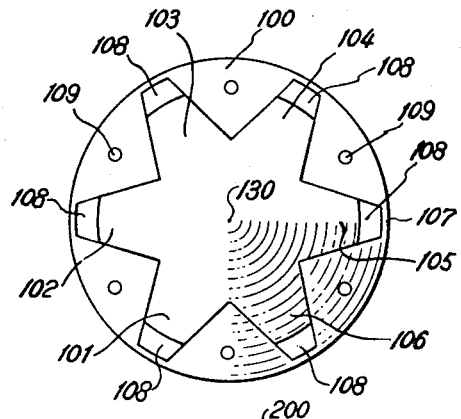
FIGURE 5 is a plan view illustrating a distributor of the classifier shown in FIG. 4.

The distributor 100 has a shape of circular cone having a circular part 110 at the lower end thereof as shown in FIGS. 4 and 5. On the conical surface of the distributor 100, there are provided with a plurality of channels 101, 102, 103, 104, 105 and 106 in the radial directions from the top 130, Each of the lower ends of the channels 101 to 106 reaches a hole 108 provided at the bottom of the circular part 100. Accordingly, a thin layer 107 remains along the outer surface of the circular plate 110 at each end of the respective channels (101 to 106).

Figure 6:
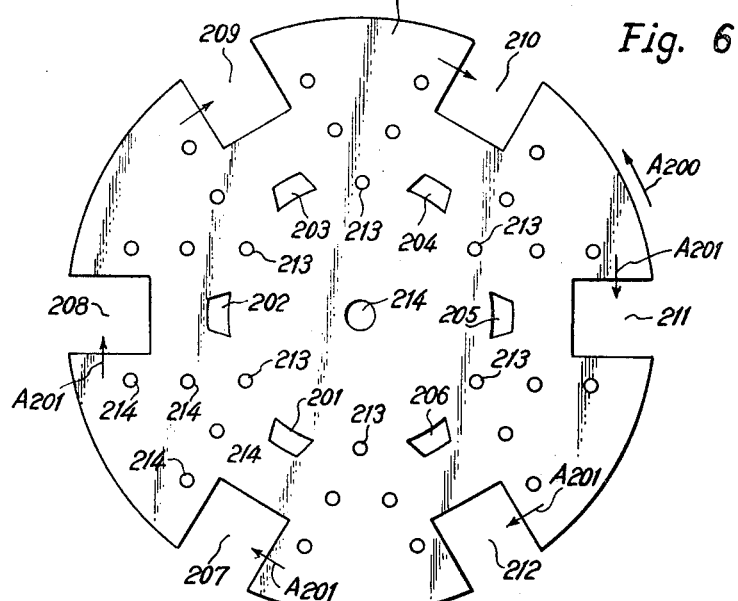
FIGURE 6 is a plan view illustrating a circular plate of the classifier shown in FIG. 4.
Figure 7:
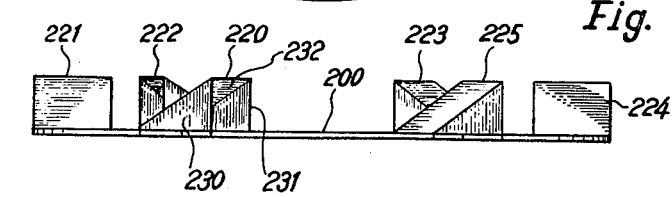
FIGURE 7 is an elevational view illustrating the circular plate and an air guide of the classifier shown in FIG. 4.

The circular plate 200 is provided with, as shown in FIG. 6, a plurality of holes 201, 202, 203, 204, 205 and 206 which coincides respectively with the holes 108. The outer edge of the circular plate 200, is provided with notches 207, 208, 209, 210 and 212 and mounted thereover air guides 220, 221, 222, 223, 224 and 225 as shown in FIG. 7. Each of the air guides 220 to 225 is composed of two right-angled triangular plates 230 and 231 arranged in parallel and a rectangular plate 232 arranged along the hypotenuses of the triangular plates 230 and 231. Accordingly, if the circular plate 200 is rotated in the direction of an arrow $A_{200}$ (FIG. 6), the air is introduced from the rectangular inlets of the respective air guides (220 to 225) to the notches (207 to 212) as shown by arrows $A_{201}$.

The distributor 100 is fixed on the circular plate 200 by a screwed bolt 140 which is passed through a hole 214 and coupled with a conical part 141 as shown in FIG. 4.

Figure 8:
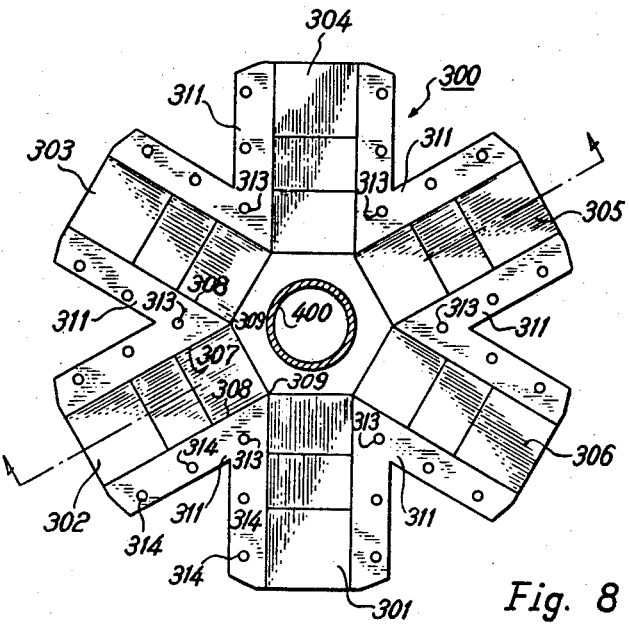
FIGURE 8 is a plan view illustrating a particle guide of the classifier shown in FIG. 4.

The guide 300 is provided with, in radial directions, a plurality of channels 301, 302, 303, 304 and 305 separated by pairs of planes 307 and 308 intersected at respective edges 309 as shown in FIG. 8. A L-shaped plate 311 is mounted at upper edges of each pair of planes 307 and 308. In case of fixing the guide 300 under the circular plate 200 by use of screwed bolts, holes 313 arranged in the L-shaped plate 311 coincide with the holes 213 of the circular plate 200 respectively. A set of holes 314 coincides with the set of holes 214 on the circular plate 200. Other set of holes on the respective L-shaped plates 311 coincide respectively with the corresponding set of holes on the circular plate 200, but reference numerals are omitted for simple illustration.

The shaft 400 is a tubular pipe with a circular-ring section and the top of the tubular shaft 400 is coupled with the center of the guide 300. A pump of suction type (not shown) sucks the air through the tube of the shaft 400 along an arrow $A_{400}$. The shaft 400 is supported by ball-bearings 401 and 402 which are fixed at fixing arms 403 and 404 respectively. A wheel 405 is fixed at the outer surface of the tubular shaft 400 and employed to rotate the shaft 400 in the direction of an arrow $A_{401}$.

The inlet guide 500 is composed of an inlet ring 501, a sieve screen 502 arranged at the lower end of the ring 501, and a conical skirt 503. The lower end 504 of the skirt 503 is fixed on the circular plate 200. The powdery material is introduced from the inlet ring 501. The sieve screen 502 is employed to separate extremely coarse particles from the introduced powdery material.

The chamber 600 has a cylindrical shape and mounted at the fixed plate 601. In the chamber 600, there is provided an inner cylinder 602 the top end 603 of which is opened in the chamber 600. Accordingly, if the shaft 400 is rotated and the air is sucked along the arrow $A_{400}$, the air is also introduced into the chamber 600 through the inner cylinder 602. A slit is provided at the surface of the outer cylinder 604 along the axial direction thereof. A triangular guide 605 is coupled to the slit so as to be arranged along the tangential direction of a circular section of the outer cylinder 604. The triangular guide 605 is coupled to an tubular guide 606.

In the operation this separator 1b, the shaft 400 is rotated to drive the wheel 405 by a driving belt, and the air is sucked through the tubular shaft 400. Accordingly, the air is introduced through the air guide (220 to 225) and the inner cylinder 602. The air introduced from the air guides (220 to 225) is separated to two streams $S_1$ and $S_2$ as shown in FIG. 4 by arrows $A_{201}$ and $A_{202}$ respectively. The stream $S_1$ is guided through the channels (301 to 306) and the inside 406 of the tubular shaft 400 The stream $S_2$ is introduced in the chamber 600 and mixed with an air stream $S_3$ which is introduced from the inner cylinder 602 and illustrated by arrows $A_{203}$. The powdery material is introduced through the inlet guide 500 to the top portion of the distributor 100 and flows down along the channels (101 to 106). The powdery material that flows down along the channels (101 to 106) is passed through the holes 108 and introduced in the channels (301 to 306). In this case, centrifugal force is applied to the powdery material that has been directed down through the holes 108. However, since the particle guide 300 (i.e.; the channel 301, 302 . . . or 306) extends in the same direction that the centrifugal force is directed, the powdery material that flows down through the holes 108 does not have a substantial velocity component in the perpendicular direction. Accordingly, the centrifugal force acts on the powdery material that flows down through the holes 108 to move the material in the direction of the outlet of the channels (301 to 306) as shown by arrows $A_{301}$. However, since the stream $S_1$ flows in the opposite direction to that of the arrow $A_{301}$. Only coarse particles are moved into the chamber 600, the fine particles being carried by the stream $S_1$ through the inside 406 of the shaft 400 and collected at a collector, such as cyclone. The coarse particles are carried by the streams $S_2$ and $S_3$ and brought into the guide 605 and the outlet 606 after being rotated along the inner wall of the outer cylinder 604.

If the flux of the fine particles or the coarse particles is measured by a flow meter, this separator 1b can be similarly employed as is the classifier 1a. However, the classifier 1b is controlled by two manipulated variables, one of which is the air velocity in the tubular shaft 400 and the other of which is the revolutions per minute (r.p.m.) of the shaft 400. When applying this classifier 1b to the systems shown in FIGS. 2 and 3, it is necessary to keep the r.p.m. of the shaft 400 at a constant value. However, if the range of measuring particle size is to be changed, the r.p.m. of the shaft 400 may be changed to an appropriate value in accordance with the measuring range.

Experimental results of the system of this invention are as follows: Powdery materials used in the experiments for the system shown in FIGURE 2 were silica sands and glass spheres, whose size ranged from 0.1 to 0.5 millimeters in which the Equation 6 can be applied according to the calculated value of Reynolds number. As is understood from the Equation 6, the terminal velocity becomes proportional to the particle size. FIGURES 9 and 10 show respectively the experimental results for glass spheres and silica sands. A fairly good agreement is found between the results by the conventional sieve screening and the present system, especially for the case of glass spheres whose nominal diameters are identical with the equivalent ones. Thus, the equipment can be used to determine the size-distribution of a powdery material under steady state conditions.

However, since the operative conditions of most processes involving powders do not change very quickly this measuring system can be used for on-line measurement of size distribution even under transient conditions. Of course, in cases where a measurement value of only average size (or cut-off size) is desired, this system will function extraordinarily well.

Figure 11:
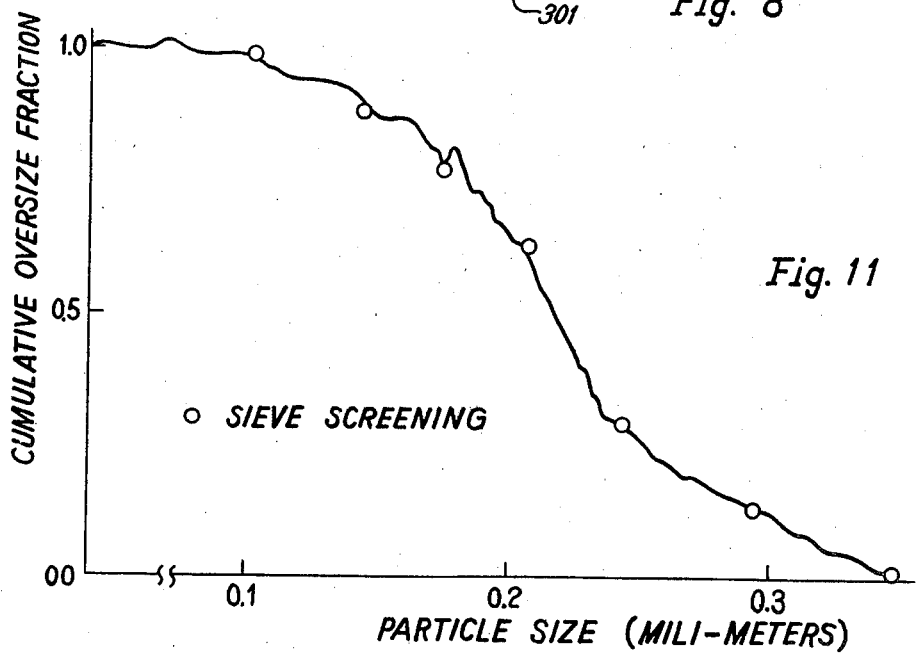
FIGURE 11 is a characteristic curve for illustrating an experimental result for glass spheres obtained in the system of FIGURE 3.

In the system shown in FIGURE 3, the fluctuation of the flux $f_1$ should be avoided to obtain a clean-separation in the elutriator 1a. An experiment was conducted under the condition of feed rate, $f_1 = 2.4$ grams/second and sweeping time $T = 60$ seconds. The sweeping speed was not necessarily uniform. FIGURE 11 shows one of the typical experimental results for glass spheres. Agreement with the result of sieve screening tests was quite satisfactory. It is noted that sweep-out time can be shortened to as low as 20 seconds.

While we have described particular embodiments of our invention, it will of course be understood that we do not wish our invention to be limited thereto, since many modifications and changes may be made and we, therefore, contemplate by the appended claims to cover all such modifications as fall within the true spirit and scope of our invention.

What we claim is:

1. A system for measuring the cumulative size-distribution of a powdery material, comprising classifier means for separating continuously a flow of the powdery material into two streams with respect to a cut-off size which is variable in accordance with a manipulated variable, guide means for guiding the flow of the powdery material to the classifier means, a first flow-meter means for measuring the flow rate of the powdery material passed through the guide means, a second flow-meter means for measuring the flow rate of one of the two separated streams, means for measuring the manipulated variable, detection means for detecting the numerical relationship that indicates the flow rate ratio between the outputs of the first and second flow-meter means, control means for continuously changing the manipulated variable measured by the means for measuring the manipulated variable, and indication means for providing information to determine a particle cut-off size, said indication means being responsive to the manipulated variable, whereby when the manipulated variable is continuously changed by the control means, the cumulative size-distribution of the powdery material travelling in an on-line process may be obtained by utilizing the particle cut-off size determined by reference to the indication means.

2. A system according to claim 1, in which the classifier means includes an air elutriator separating the flow of the powdery material into a stream of fine particles and a stream of coarse particles, the air velocity of the air elutriator being employed as the manipulated variable.

3. A system according to claim 2, in which the air velocity is eneregized by a suction pump inserted in the path of the air along the stream of the fine particles, and in which the control means comprises a throttle valve inserted in the path of the air to control the air velocity in accordance with the numerical relationship detected.

4. A system according to claim 1, in which the classifier means includes a centrifugal separator in which one of two manipulated variables thereof is set at a constant value while the other of the two manipulated variables is utilized as the controlled manipulated variable.

5. A system according to claim 4, in which the centrifugal separator comprises a tubular shaft having a driving wheel the r.p.m. of which is one of the two manipulated variables, a particle guide fixed at the top of the tubular shaft and having a plurality of channels which are arranged in radial directions from the top of the tubular shaft and connected to the inside of the tubular shaft, a circular plate fixed on the particle guide, a distributor having the shape of a circular cone is fixed on the circular plate and having a plurality of channels which are arranged in radial direction along the conical surface of the distributor and having holes connected to the channels of the particle guide through holes in the circular plate, air guides arranged on the circular plate for introducing the air to the respective channels of the particle guide in accordance with the rotation of the tubular shaft, an inlet guide to guide the powdery material to the top of the distributor, and a cylindrical chamber fixed at the outside of the particle guide concentrically with the axis of the tubular shaft and having an inside cylinder to introduce the air in this chamber and an outlet to guide the stream of coarse particles to the outside the air velocity in the tubular shaft being employed as one of the two manipulated variables, whereby when the tubular shaft is rotated by the driving wheel and the air is sucked through the tubular inside of the shaft, the stream of fine particles is obtained from the lower end of the shaft.

6. A system according to claim 1, in which the indication means comprises an X–Y recorder and a function generator calculating the manipulated variable, the X–Y recorder receiving the numerical relationship as its Y-signal from the detection means and receiving the output of the function generator as its X-signal, whereby the X–Y recorder describes a cumulative size distribution curve in response to a continuous and unidirectional change of the manipulated variable.

7. A system for continuously analyzing the distribution of small particles moving along a process line comprising means for continuously separating a flow of the particles into two streams determined by an adjustable cut-off size, means for guiding the flow of particles to said separating means, a first flow meter means for measuring the flow rate of the particles that flow through the guiding means, a second flow meter means for measuring the flow rate of one of the two separated streams of particles, means for measuring a manipulated variable, means for detecting the numerical relationship that indicates the flow rate ratio between the outputs of said first and second flow meter means, control means for continuously changing the manipulated variable and means responsive to the manipulated variable for providing information to determine a size distribution of the particles.

8. Apparatus for particle size analysis comprising means for continuously separating a flow of particles moving along a process line of particles into a plurality of streams determined by an adjustable cut-off size, means for measuring the flow rate of particles before it is separated into the plurality of streams, means for measuring the flow rate of one of the plurality of separated streams, means for measuring a manipulated variable, means for detecting the numerical relationship that indicates the flow rate ratio between the outputs of said first and second flow rate measuring means, control means for continuously changing the measured manipulated variable and means responsive to the measured manipulated variable for providing information to determine a size distribution of the particles.

9. A system for particle size analysis comprising means for continuously separating a flow of particles moving along a process line of particles into two streams determined by an adjustable cut-off size, means for carrying one of the two streams in a current of air and means responsive to the flow rate of the flow of particles before separation into the two streams and the flow rate of one of the two streams to vary the velocity of the current of air carrying one of the two streams whereby the velocity of the current of air may be utilized to determine a size distribution of the particles.

References Cited

UNITED STATES PATENTS 3,133,445   5/1964   Richard.
3,377,597   4/1968   Muta.

FRANK W. LUTTER, Primary Examiner

U.S. Cl. X.R.

209—1, 10, 138